United States Patent [19]
Dernovsek et al.

[11] Patent Number: 5,695,170
[45] Date of Patent: Dec. 9, 1997

[54] ROTARY VALVE

[75] Inventors: John R. Dernovsek, Cypress; David W. Gent, Houston, both of Tex.

[73] Assignee: Bray International, Inc., Houston, Tex.

[21] Appl. No.: 598,407

[22] Filed: Feb. 8, 1996

Related U.S. Application Data

[63] Continuation of Ser. No. 202,031, Feb. 18, 1994, abandoned.
[51] Int. Cl.⁶ ..................................... F16K 1/22
[52] U.S. Cl. ............................. 251/305; 251/306
[58] Field of Search ............................ 251/305, 306

[56] References Cited

U.S. PATENT DOCUMENTS

| | | | |
|---|---|---|---|
| 2,994,342 | 8/1961 | Stillwagon | 251/306 X |
| 3,447,780 | 6/1969 | Holson, Jr. | 251/306 X |
| 3,776,509 | 12/1973 | Lebland | 251/306 |
| 4,754,530 | 7/1988 | Eff | 251/306 |

FOREIGN PATENT DOCUMENTS

| | | |
|---|---|---|
| 0018220 | 10/1980 | European Pat. Off. . |
| 7308370 | 6/1973 | Germany . |
| 3815893 | 11/1989 | Germany . |
| 1404201 | 8/1975 | United Kingdom . |
| 1456181 | 11/1976 | United Kingdom . |

*Primary Examiner*—John Fox
*Attorney, Agent, or Firm*—Vaden, Eickenroht & Thompson, L.L.P.

[57] ABSTRACT

There is disclosed a butterfly valve having a body connectable in a flowline and a seat which lines its inner side, and a disc which has stem portions at its opposite ends closely received within openings in the seat and body to permit the disc to be rotated between opened and closed positions. A ring which is restrained from movement with one of the disc and seat in a direction transverse to the stem portions substantially fills a groove in the other of the disc and seat which surrounds each stem portions so as to seal between the seat, disc and such stem portion.

8 Claims, 2 Drawing Sheets

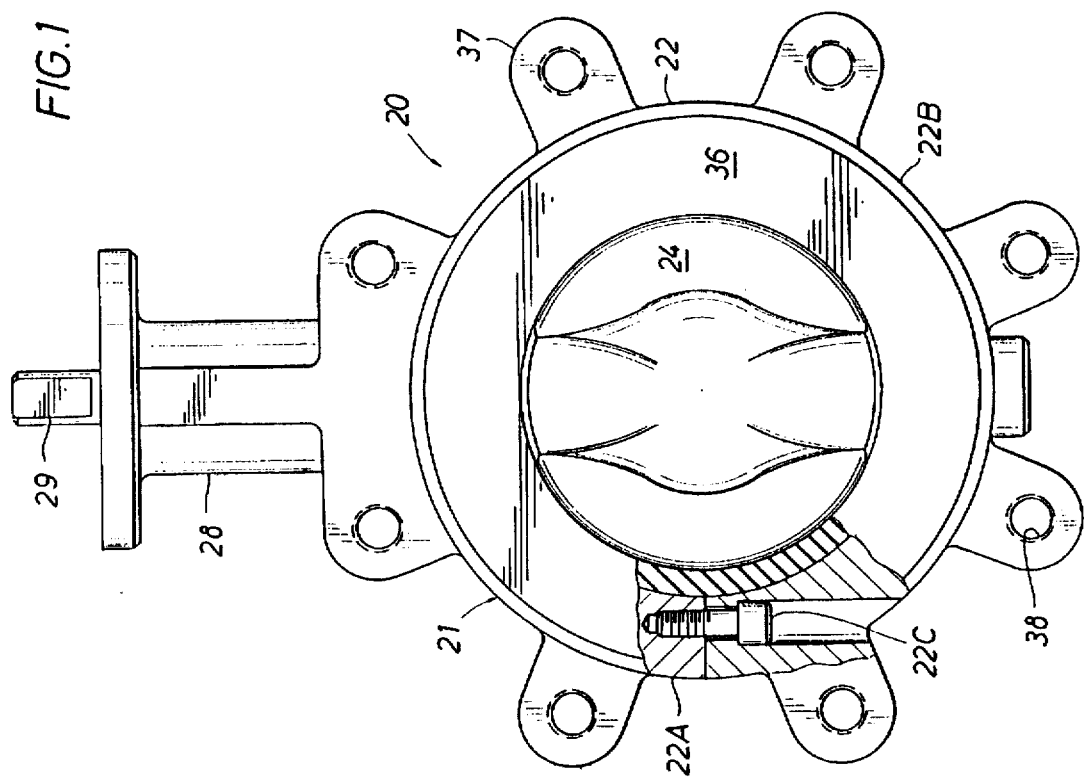
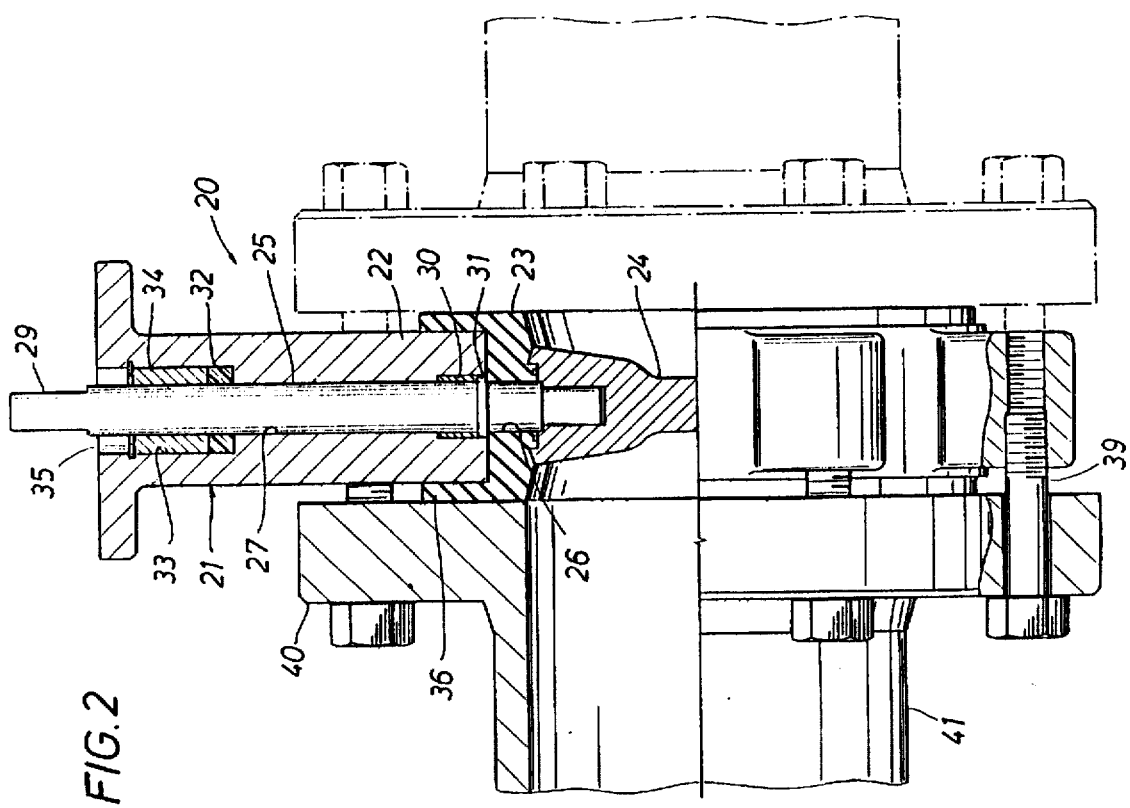

ROTARY VALVE

This application is a continuation of application Ser. No. 08/202,031, filed Feb. 18, 1994, now abandoned.

This invention relates generally to improvements in rotary valves having a closure member whose stem portions on its opposite ends are received within openings in the body of the valve to permit it to be rotated by an operator on the outer end of one stem portion between opened and closed positions. More particularly, it relates to improvements in rotary valves of the type wherein the body includes a seat or liner about its inner side with which the closure member is tightly engaged and having openings in which stem portions are closely received. Although applicable to various types of rotary valves, the invention has particular utility in a butterfly valve in which the closure element is a disc whose outer peripheral edge is sealed with respect to the seat in its closed position.

To improve the pressure capacity of the valve, as well as to protect metal parts of the body from corrosive and otherwise damaging line fluids, the seat or liner is usually made of an elastomeric or otherwise deformable material. Although a tight fit of the closure element in the seat may prevent leakage past the closure element, it is still necessary to prevent leakage of line fluid past the stem portions to the outside of the valve. For this purpose, the adjacent ends or hubs of the stem portions and seat form an interference fit with one another and the stem portions form an interference fit with the openings in the seat through which they extend.

In the case of a butterfly valve, the liner is clamped in place between opposite ends of a flowline, as by means of annular flanges at the ends of the seat, so as to hold the liner in place. However, when, during use, the valve is at the "end of the line," for example, during servicing or repair, the closed disc forms an end closure for the line with full line pressure acting over it, and, since there is no flowline connection to clamp the downstream flange of the stem in place, the openings in the stem portions may elongate and pull away from the stem portions, thus forming leak paths between them.

It is therefore the object of this invention to improve the pressure capacity of such a valve by minimizing the likelihood any such leak paths, and, in particular, restraining the seat openings from pulling away from the stem portions.

This and other objects are accomplished, in accordance with the illustrated embodiments of the invention, by a valve of the type described in which a ring is restrained for movement with one of the closure element and seat in a direction transverse to the stem portions and substantially fills a groove formed between a recess in the other of each of the closure element and seat which surrounds each stem portion and each stem portion which the ring surrounds so as to seal between the seat, closure element and such stem portion. Thus, because of its tight fit in the groove, the ring resists any tendency of the seat to move away from either stem portion and thus insures a tight seal between the closure element, stem portions and seat even in the most adverse circumstances.

Preferably, and as illustrated, the valve is a butterfly valve wherein the body of the valve includes a tubular member which is connectable in the flowline, a seat which lines the inner diameter of the tubular member, and the closure member is a disc whose outer peripheral edge tightly engages the inner diameter to the seat when closed.

In one embodiment of the invention, each ring is integral with the seat to fit within a recess in an end of the closure element. In another embodiment, the ring is separate and closely received in opposed recesses in both the closure element and seat. In still another embodiment, the ring is integral with the closure element to fit within a recess in the seat. In this latter case, the seat is preferably of a relatively rigid material so as to minimize any tendency for its openings to move away from the stem portion it surrounds.

Preferably, each stem portion is press-fitted into the opening in the seat, and each ring protrudes a distance greater than the depth of the recess so as to be deformed into tight sealing engagement with the bottom as well as the outer side of the recess.

In other respects, this invention contemplates that the seat as well as the closure element may be made of a wide variety of materials, whether metal or relatively rigid plastics or rubber or other elastomer, as may be desirable to form a tight seal between the seat and closure element in the closed position of the valve. Also, adjacent ends of the ring and recess may be flat or of other configuration.

In the drawings, wherein like reference characters are used throughout to designate like parts:

FIG. 1 is an end view, broken away in part, of a butterfly valve constructed in accordance with the present invention, and with the disc in its closed position;

FIG. 2 is a side view, partly in section, of the butterfly valve of FIG. 1, with its left side connected to one end of a flowline, but with the other end of the flowline shown in phantom lines, disconnected from its right side;

Figure 3:
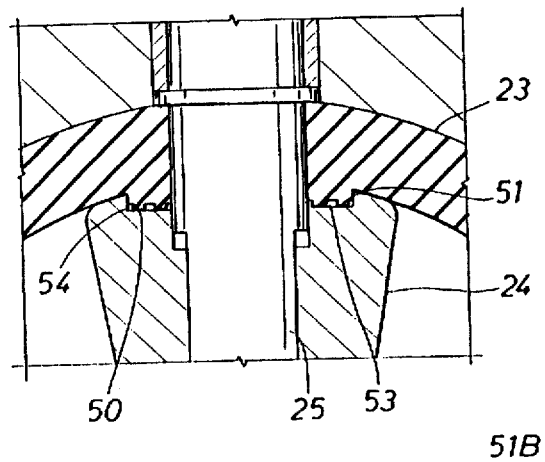
FIG. 3 is an enlarged cross-sectional view of that portion of the valve shown in FIG. 2 wherein a stem portion at one end of the disc extends through an opening in the portion of the seat adjacent thereto, and showing one embodiment of the invention wherein the ring is integral with the seat and fits within a recess in the adjacent end of the disc which surrounds the stem portion.
Figure 4:
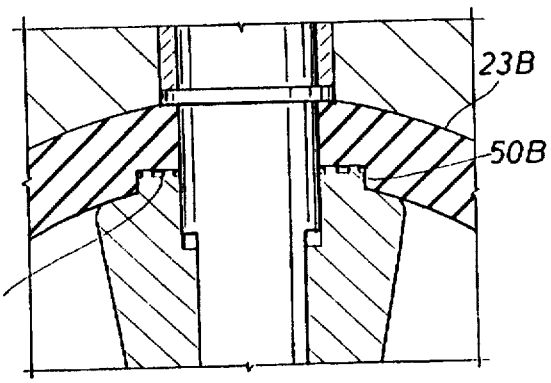
FIG. 4 is a partial sectional view of a valve, similar to FIG. 3, but illustrating another embodiment of the invention wherein the ring is integral with the disc and fits within a recess in the seat which surrounds the stem portion.
Figure 5:
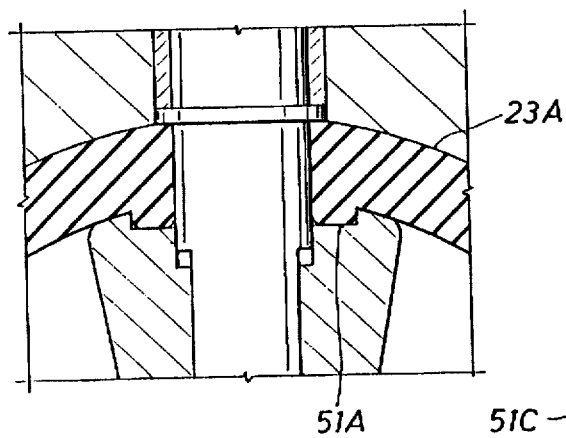
Figure 6:
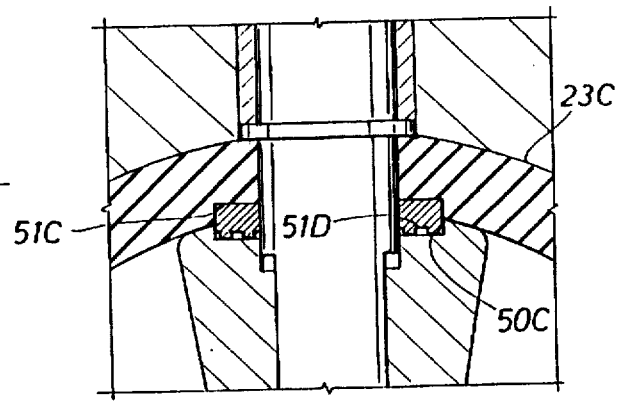

FIG. 5 is another partial sectional view of the valve, similar to FIGS. 3 and 4, but illustrating still another embodiment of the invention wherein, as in the embodiment of FIG. 3, the ring is formed on the seat, but wherein the bottom surface of the ring is of a different configuration; and FIG. 6 is yet another partial sectional view of the valve, similar to FIGS. 3 to 5, but illustrating a further embodiment of the invention wherein the ring is separate and received within oppositely facing recesses in the seat and the adjacent end of the disc which surround the stem portion.

With reference now to the detail of the above-described drawings, the over-all valve, which is indicated in its entirety in FIGS. 1 and 2 by reference character 20, includes a valve body 21 made up of a tubular member 22 connectable in a flowline (as will be described) and a seat or liner 23 disposed about the inner diameter of the tubular member to provide a flow way through the valve. More particularly, the valve 20 includes a disc 24 having a stem portion 25 at each end (only the upper stem portion being shown) closely received within aligned openings 26 and 27 in the liner and tubular member 22.

In the illustrated embodiment of the valve, the stem portions are separate from one another, with the inner end of the upper having a noncircular connection with the adjacent end of the disc so as to impart rotation to the disc and extending through a neck 28 on the upper side of the tubular member to provide an outer end 29 to which an operator mounted on the neck may be connected in order to impart rotation to the upper stem portion and thus to the disc. It will be understood, however, that the stem portions may instead be integral or connected to one another for extending through the disc.

A bearing sleeve 30 received in the lower end of the opening 27 surrounds the stem portion above a flange 31 thereabout to prevent the stem portion from being blown out of the opening 27. The upper end of the stem portion is surrounded by packing 32 received in an upper recess 33 in the neck 28 and held down by a bearing sleeve 34 and retainer ring 35.

In the illustrated embodiment of the valve 20, the tubular member is made up of split halves 22A and 22B which are connected to one another by bolts 22C (see FIG. 1). Also, the seat or liner 23 has flanges 36 at each end which extend outwardly over the outer sides of the tubular member.

As also illustrated, the tubular member 22 has ears 37 which project from its outer periphery and which have holes 38 formed therein to receive bolts 39 for connection to the hubs 40 of each end of the flowline thereto. When so connected, the hubs press tightly against the flanges 36 of the liner so as to hold the flange in place and close off the annular space between the opposite sides of the flanges 40 and the tubular member.

However, as previously mentioned, and as illustrated in FIG. 2, the valve may, in use, such as during service or repair, be disposed at "the end of the line" in that the right-hand end of the flowline (shown in phantom lines) is removed therefrom. As will be understood from FIG. 2, the closed disc is thus subjected to the line pressure tending to move it laterally down the flowline, which in turn tends to distort the liner 23 whose right-hand flange 36 is no longer supported by an end of the flowline. As previously mentioned, it is this environment in which the present invention has particular utility.

Thus, as illustrated in FIG. 2, and in more detail in FIG. 3, a ring 50 of cylindrical shape is formed integrally with the liner 23 and fits within so as to substantially fill a groove which is formed between a recess 51 in the disc 24 which surrounds the adjacent stem portion 25 and the stem portion. As previously described, since the ring is thus restrained for movement with the liner and is closely received in the recess 51 in the disc which surrounds the stem portion, the opening through the liner has little or no opportunity to elongate, despite forces tending to push the liner out of the tubular member of the valve body. Hence, the ring forms a seal with the disc, liner and stem portion it surrounds.

As previously described, in a valve of this type, the stem portion is of slightly larger diameter than the opening in the liner so that it forms a "press fit" therewith including the integral ring 50. As fabricated, the outer diameter of the ring is at least substantially the same as the outer diameter of the groove 51. However, press-fitting of the stem portion into the opening through the liner will expand it so that the outer diameter of the stem portion will also form a tight fit with the inner diameter of the ring within the groove. Additionally, the ring 50 protrudes from the inner diameter of the liner a distance greater than the depth of the groove and also becomes deformed in a tight sealing engagement with the bottom of the groove, thus insuring a tight fit between each of the liner, disc, and stem portion.

The invention contemplates that the adjacent surfaces on the lower end of the ring and bottom of the recess may be of various configurations. As shown, an annular groove 54 may be formed in the end of the ring so as to provide a tortuous path inhibiting the flow of line fluid past the ring. Additionally, grooves may be formed on the inner and outer corners of the ring.

As previously mentioned, the liner of such a valve is conventionally formed of rubber or other elastomeric material. Alternatively, it may be a plastic material which is sufficiently deformable to permit the stem portions to be press-fitted through its openings and its inner diameter to seal about the periphery of the disc.

As shown, the adjacent end surfaces of the disc portions and inner diameter of the seal are spherical. However, they may instead be flat.

The embodiment of the valve shown in FIG. 5 is similar to that above described, except for the construction of the ring 51A. Thus, in this embodiment, instead of being flat, the end of the ring is rounded adjacent its inner and outer diameters, thus providing a central portion which is of a depth to tightly engage the bottom of the groove, but providing spaces adjacent the inner and outer diameters of the bottom of the ring.

In the embodiment of the invention illustrated in FIG. 4, the ring 50B is instead formed integrally with the stem portion and fits closely within a groove which is formed between a recess 51B formed in the inner periphery of the liner 23B and the stem portion to surround the stem portion. Despite this reversal of the arrangement of the ring and groove, they perform the same function in restraining the opening formed through the liner from elongating to provide a leak path about the stem portion, although, as previously noted, the seal or liner in this embodiment is of a relatively rigid material to minimize its flow away from the outer diameter of the ring. As in the case of the ring 50, the ring 51 has grooves formed in its end which tightly engage the bottom of the groove in the liner 23B.

In the embodiment shown in FIG. 6, a separate ring 50C fits within opposed grooves which are formed between recesses 51C formed in the seat 23C and 51B formed in the stem portion 24, both grooves surrounding the stem portion and being of the same diameter so that their outer diameters are aligned to closely receive opposite ends of the ring 50C. As shown, the bottom end of the ring has grooves formed therein, as described in connection with the ring 50 of FIG. 3.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A butterfly valve, comprising
   a body having a seat of deformable material which lines its inner side,
   a disc having an outer edge tightly engaged with the inner diameter of the seat and stem portions at its opposite ends closely received within openings in the seat and body to permit the disc to be rotated within the seat between valve opening and closing positions, and
   a ring restrained for movement with one of the disc and seat in a direction transverse to the stem portions and substantially filling a cylindrical groove formed between a cylindrical recess in the other of the disc and seat and each stem portion which the ring surrounds so as to resist any tendency of the seat to move away from either stem portion, each stem portion having an annular surface about its recess which is tightly engaged with an adjacent annular surface of the inner diameter of the seat over the entire width of said surfaces outwardly of the recess, and each ring having an end with its outer cylindrical side formed on a diameter somewhat greater than that of the outer diameter of the recess and a thickness in a direction axially of the ring and stem portion which is somewhat greater than the depth of the groove, so that the ring is press fitted into the groove to cause its end to be sealably engaged with the bottom of the groove and its outer cylindrical side to be sealably engaged with the inner diameter of the recess.

2. A butterfly valve of the character defined in claim 1, wherein each ring is integral with the seat and the recess is in the disc.

3. A butterfly valve of the character defined in claim 2, wherein the seat is formed of a deformable material.

4. A butterfly valve of the character defined in claim 1, wherein each ring is integral with the disc and the recess is in the seat.

5. A butterfly valve of the character defined in claim 4, wherein the seat is formed of a relatively rigid material.

6. A butterfly valve of the character defined in claim 1, wherein each ring is separate from the seat and disc and closely received in opposed recesses in both.

7. A butterfly valve of the character defined in claim 6, wherein the seat is formed of a relatively rigid material.

8. A rotary valve of the character defined in claim 1, wherein the ring has an annular groove formed therein to provide a tortuous fluid path between the ring and recess.

* * * * *

UNITED STATES PATENT AND TRADEMARK OFFICE
CERTIFICATE OF CORRECTION

PATENT NO. : 5,695,170
DATED : December 9, 1997
INVENTOR(S) : John R. Dernovsek
David W. Gent It is certified that error appears in the above-indentified patent and that said Letters Patent is hereby corrected as shown below:

In the Abstract, line 9, change "portions" to --portion--;
Col. 1, line 37, change "stem" to --seat--;
Col. 1, line 38, change "stem" to --seat--;
Col. 1, line 43, after "likelihood" insert --of--.

Signed and Sealed this

Seventeenth Day of March, 1998

Attest:

BRUCE LEHMAN

Attesting Officer

Commissioner of Patents and Trademarks